US 8,682,845 B2

(12) United States Patent
Bettger et al.

(10) Patent No.: US 8,682,845 B2
(45) Date of Patent: Mar. 25, 2014

(54) SECURE HIGH PERFORMANCE MULTI-LEVEL SECURITY DATABASE SYSTEMS AND METHODS

(75) Inventors: David D Bettger, Redondo Beach, CA (US); Ismael Rodriguez, Colorado Springs, CO (US); Kevin A Stone, Hermosa Beach, CA (US); Dennis L Kuehn, Redondo Beach, CA (US); Marc A. Peters, Garden Grove, CA (US); David H Wagner, Colorado Springs, CO (US)

(73) Assignee: The Boeing Company, Chicago, IL (US)

( * ) Notice: Subject to any disclaimer, the term of this patent is extended or adjusted under 35 U.S.C. 154(b) by 832 days.

(21) Appl. No.: 12/497,408

(22) Filed: Jul. 2, 2009

(65) Prior Publication Data
US 2010/0011007 A1 Jan. 14, 2010

Related U.S. Application Data

(60) Provisional application No. 61/079,332, filed on Jul. 9, 2008.

(51) Int. Cl.
*G06F 7/00* (2006.01)
(52) U.S. Cl.
USPC ........... 707/609; 707/827; 709/223; 709/224; 711/114; 711/163
(58) Field of Classification Search
USPC ............ 707/999.01, 609, 827; 709/223, 224; 711/114, 163
See application file for complete search history.

(56) References Cited

U.S. PATENT DOCUMENTS

| | | | |
|---|---|---|---|
| 5,799,206 A | 8/1998 | Kitagawa et al. | |
| 5,893,166 A | 4/1999 | Frank et al. | |
| 6,088,796 A | 7/2000 | Cianfrocca et al. | |
| 6,687,702 B2 | 2/2004 | Vaitheeswaran et al. | |
| 6,728,963 B1 | 4/2004 | Forin et al. | |
| 7,206,805 B1 | 4/2007 | McLaughlin, Jr. | |
| 2002/0112181 A1 | 8/2002 | Smith | |
| 2003/0033441 A1 | 2/2003 | Forin et al. | |

(Continued)

FOREIGN PATENT DOCUMENTS

EP 1251423 10/2002

OTHER PUBLICATIONS

Druschel et al., IO-Lite: a unified I/O buffering and caching system, 2000, ACM, pp. 34-66.

(Continued)

*Primary Examiner* — Hosain Alam
*Assistant Examiner* — Jieying Tang
(74) *Attorney, Agent, or Firm* — Haynes and Boone, LLP

(57) ABSTRACT

In accordance with one or more embodiments of the present disclosure, systems and methods described herein provide for transferring data over one or more networks. A storage area network is adapted to communicate with the one or more networks. A first component is adapted to route data to and from the storage area network. A second component is adapted to route data to and from the storage area network. A gateway component is adapted to control the routing of data between the first and second components and the storage area network. The storage area network is adapted to separate metadata from the data and store the metadata in a secure server positioned behind the gateway component.

24 Claims, 22 Drawing Sheets

(56) References Cited

U.S. PATENT DOCUMENTS

| | | |
|---|---|---|
| 2003/0056063 A1 | 3/2003 | Hochmuth et al. |
| 2003/0088544 A1 | 5/2003 | Kan et al. |
| 2004/0015724 A1* | 1/2004 | Pham et al. .................. 713/201 |
| 2004/0025008 A1 | 2/2004 | Kuehn et al. |
| 2004/0117438 A1 | 6/2004 | Considine et al. |
| 2004/0162930 A1 | 8/2004 | Forin et al. |
| 2005/0132070 A1* | 6/2005 | Redlich et al. ................ 709/228 |
| 2005/0223018 A1 | 10/2005 | Forin et al. |
| 2005/0226406 A1 | 10/2005 | Forin et al. |
| 2005/0246511 A1 | 11/2005 | Willman et al. |
| 2005/0251522 A1* | 11/2005 | Clark ........................... 707/100 |
| 2006/0235985 A1 | 10/2006 | Ramkumar |
| 2008/0052328 A1* | 2/2008 | Widhelm et al. ............. 707/204 |

OTHER PUBLICATIONS

Kath, Managing memory-mapped files in Win32, 1993, Micorsoft, pp. 1-13.

Definition for "Network", The authoritative Dictionary of IEEE Standards Terms, 2000, IEEE Press.

* cited by examiner

SECURE HIGH PERFORMANCE MULTI-LEVEL SECURITY DATABASE SYSTEMS AND METHODS

CROSS-REFERENCE TO RELATED APPLICATIONS

This application claims priority to and the benefit of U.S. Provisional Patent Application No. 61/079,332, filed Jul. 9, 2008, which is incorporated herein by reference in its entirety. This application is related to U.S. patent application Ser. No. 10/211,086, filed Aug. 2, 2002, which is incorporated herein by reference in its entirety.

TECHNICAL FIELD

The present invention relates generally to network systems and, more particularly, to secure high-performance multi-level security database systems and methods.

BACKGROUND

Generally, network-based services and transactions typically require transmission of sensitive data over a communication network, such as the Internet. The amount of sensitive information that is processed by security gateways and stored by internal network databases are typically accessible via the same communication network, such as the Internet and/or any other type of external network.

These security gateways and databases typically process large data files (e.g., metadata and data) slowly, and data files are often replicated in each security domain (a group of computers and devices on a network that are administered under the same protocol) for sharing, which add complexity and configuration management problems to the system resulting in adding great latency for reduce performance of the system.

As a result, there is a need for an improved data transfer system for security gateways and databases.

SUMMARY

Systems and methods disclosed herein, in accordance with one or more embodiments, provide for separating metadata from data, encrypting and storing raw data in a storage area network (SAN) environment while storing metadata in dedicated servers placed behind a multi-level security gateway, which controls authorizations and decryption keys that are needed for access to the specific files in the SAN.

One or more embodiments of the present disclosure provide for reducing the need to replicate data in multi-level security (MLS) information sharing environments, improving MLS Gateway performance by reducing the size of data processed, and improving performance when retrieving large data files from an MLS database using dedicated fibre channels, while maintaining and improving high assurance One or more embodiments of the present disclosure reduce the need for separate SAN storage for each security domain, which results in financial savings for large operations, reduce the need for data replication, when sharing across security levels, and improving performance of large data transfers controlled by an MLS gateway. In one aspect, this allows processing of small metadata files for access controls, instead of processing large data files.

In accordance with one or more embodiments of the present disclosure, MLS network architecture provides an efficient mechanism to share large data files across multiple security levels with high assurance. Data with multiple security classifications may co-exist in a same storage area with reduced need for duplication of replication data, which reduces the amount of storage needed in an MLS environment. In one aspect, disk controllers with integrated encryption are adapted to encrypt data upon storage and decrypt upon retrieval once the MLS gateway authorizes the session. The MLS gateway more efficiently controls access to appropriate data files by directly controlling access to associated metadata. This improves performance and enhances security. Unauthorized access is significantly reduced due to multiple layers of defense provided by dedicated storage network connections (e.g. Fibre Channel), decryption keys, data without metadata mixed together, and a high assurance MLS gateway adapted to control access to the MLS SAN system.

In accordance with an embodiment of the present disclosure, a system for transferring data over one or more networks includes a storage area network (SAN) adapted to communicate with the one or more networks, a first component adapted to route data to the storage area network via a first storage network connection (e.g., a first fibre channel), a second component adapted to route data to the storage area network via a second storage network connection (e.g., a second fibre channel), and a gateway component adapted to control the routing of data between the first and second components and the storage area network. The storage area network is adapted to separate metadata from the data and store the metadata in a secure server positioned behind the gateway component.

In one aspect, the storage area network may be adapted to encrypt and store the data in another database separate from the metadata database. In another aspect, the gateway component may comprise a multi-level security gateway adapted to control one or more authorizations and decryption keys for accessing the data in the storage area network. In still another aspect, the gateway component may comprise a multi-level security gateway component adapted to control the access to data in the storage area network from one or more different security domains.

In one implementation, the system further comprises a metadata controller adapted to separate metadata from the data, store the metadata in a first database, and store the data without metadata in a second database. A channel switching mechanism may be adapted to route data between the metadata controller and one or more of the first component, the second component, the first database, and the second database. The channel switching mechanism may include one or more shared storage network ports that are adapted to be controlled by the metadata controller, and the use of the shared storage network ports are monitored by the metadata controller. The shared storage network ports may be enabled by the metadata controller for use, and the shared storage network ports may be disabled by the metadata controller when not in use.

The scope of the present invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like devices illustrated in one or more of the figures.

DETAILED DESCRIPTION

Figure 1:
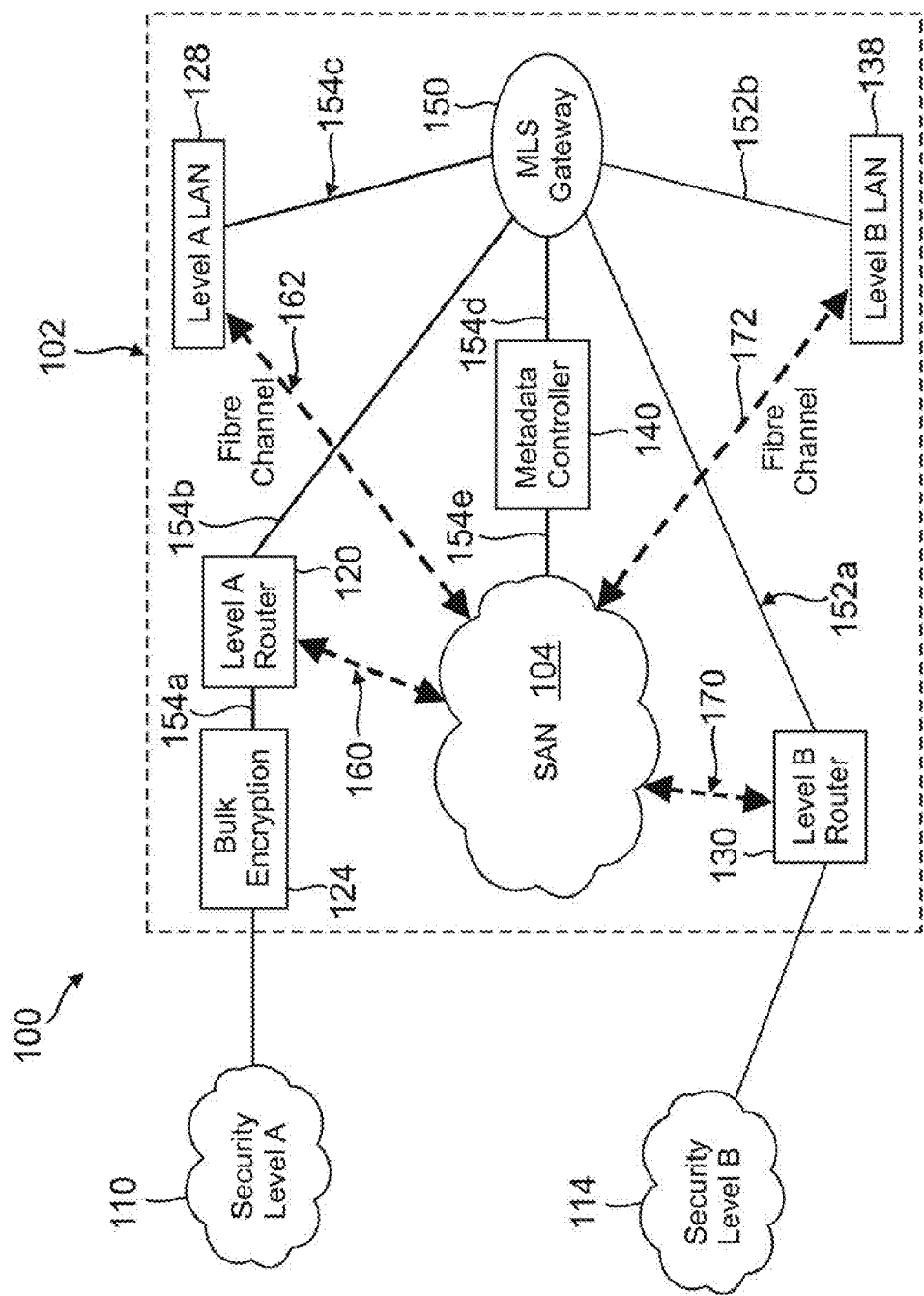
FIG. 1 shows a block diagram of a system for securing network data, in accordance with an embodiment of the present disclosure.

In accordance with one or more embodiments of the present disclosure, systems and methods disclosed herein provide for separating metadata from data, encrypting and storing raw data in a Storage Area network (SAN) environment while storing metadata in dedicated servers (e.g., separated by security level) placed behind a multi-level security gateway, which controls authorizations and decryption keys for access to the specific files in the SAN.

In accordance with one or more embodiments of the present disclosure, MLS network architecture provides an efficient mechanism to share large data files across multiple security levels with high assurance. Data with multiple security classifications may co-exist in a same storage area with reduced need for duplication of replication data, which reduces the amount of storage needed in an MLS environment. In one aspect, disk controllers with integrated encryption are adapted to encrypt data upon storage and decrypt upon retrieval once the MLS gateway authorizes the session. The MLS gateway more efficiently controls access to appropriate data files by directly controlling access to associated metadata. This improves performance and enhances security. Unauthorized access is significantly reduced due to multiple layers of defense provided by dedicated fibre channels, decryption keys, data without metadata mixed together, and a high assurance MLS gateway adapted to control access to the MLS SAN system.

In accordance with one or more embodiments of the present disclosure, systems and methods for securing network data provide security for internal networks by utilizing common storage devices for exchange of data between external and internal components without creating a concurrent session between the external and internal components. In one aspect, when the protocol of the external network is Internet protocol (IP), the protocol used for the internal network may be a non-IP messaging protocol that is a more secure protocol than IP and insulates the internal network from the type of attacks that are common in IP networks. These security measures may be implemented without a significant change to hardware and/or software components of the internal and/or external networks, and thus, without adding significant cost to the network administration and without the network performance degradation that is characteristic of conventional security measures.

In various implementations, systems and methods disclosed herein support at least two separate networks (e.g., a first network may be referred to as a secret network and the other network may be referred to as an SBU network) and allows for information sharing between security domains. In various aspects, the systems and methods disclosed herein support processing and dissemination of data (e.g., quick look data) across multiple security domains, connect multiple levels of security, and provide a file system security technique that adds another layer of protection for large database systems.

FIG. 1 shows one embodiment of a security database system 100 comprising a multi-level security (MLS) system 102 adapted to communicate with a first security network 110 and a second security network 114. In various implementations, the first security network 110 may be referred to as security level A, and the second security network 114 may be referred to as security level B. In one aspect, FireBreak refers to separating data and metadata, which is made available only to authorized users without creating concurrent sessions between the internal and external components. In another aspect, FireBreak is adapted to provide additional database security for protection against unauthorized access by internal and external users.

In one embodiment, FireBreak refers to a file system security application that incorporates a technique for allowing additional database security for protection against unauthorized internal and external users of the database. In one aspect, FireBreak is intended for use at system-high only where the data and metadata are separated and made available only to the authorized users without creating concurrent sessions between the internal and external components.

In one embodiment, as shown in FIG. 1, the MLS system 102 comprises a storage area network (SAN) 104, a first router 120 an encryption component 124, a first local area network (LAN) 128, a second router 130 a second LAN 138, a metadata controller (MDC) 140 and an MLS gateway 150.

In one embodiment, the MLS gateway and MLS systems offer network users the ability to process and transfer data of more than one security level while maintaining control of the data according to their sensitivity. In one aspect, the MLS gateway may be referred to as a trusted hardware and/or software device that has been evaluated and authorized to securely transfer data across multiple security domains. These types of secure gateways may also be referred to as Control Interface, MLS Guard, High Assurance Guard (HAG), and Cross domain Solution (CDS).

In various embodiments, the SAN 104 comprises a Multi-Level Security (MLS) data transfer environment for storage area network based data transfers, Firebreak IP based data transfers and SCSI based data transfers. In one implementation, the SAN 104 may include and utilize one or more MLS databases (not shown) to assist with secure data transfers between components of the MLS system 102. As such, encryption in the SAN 104 may be enabled at the CPU level for protection of data stored in one or more MLS databases. In one aspect, the encryption capability may be integrated into one or more RAID controllers, and the encryption may not affect the operation of the MLS system 102, the SAN 104, and/or the various other components thereof.

In various implementations, the SAN 104 provides a layer of protection to data by providing a secure storage area with multiple domains and separating file system metadata (e.g., inodes, indirect extents, directories) from user data. Database access within the SAN 104 is controlled by the MLS gateway 150 and the separate metadata controller 140. When authorized, data is transferred through one or more dedicated high-speed storage network connections 160, 162, 170, 172 (e.g., high speed fibre channels). In one implementation, the SAN 104 comprises high-performance metadata positioning and no head seek conflict on reads and writes of short and long data. In one aspect, data transfers may be similar in scope to a drop-box proxy.

As shown in FIG. 1, level A communication (e.g., fibre channel communication) occurs between the first router 120 (i.e., level A router) and the SAN 104 via fibre channel 160, and level A fibre channel communication occurs between the first LAN 128 (i.e., level A LAN) and the SAN 104 via fibre channel 162.

As shown in FIG. 1, level A IP communication occurs between the first router 120 (i.e., level A router) and the encryption component 124 via IP channel 154a and the MLS gateway 150 via IP channel 154b, and level A IP communication occurs between the first LAN 128 (i.e., level A LAN) and the MLS gateway 150 via IP channel 154c. Also, level A IP communication occurs between the MLS gateway 150 and the metadata controller 140 via IP channel 154d, and level A IP communication occurs between the metadata controller 140 and the SAN 104 via IP channel 154e.

In various implementations, the MLS system 102 is adapted to communicate with the first security level 110 via the first router 120 (i.e., level A router) and the encryption component 124 (e.g., bulk encryption component). For example, the first router 120 is adapted to communicate with the SAN 104 (e.g., MLS network) via the fibre channel 160. As such, data may be securely transferred between the first router 120 and the MLS network 104 via the fibre channel 160. In another example, the first LAN 128 is adapted to communicate with the MLS network 104 via the fibre channel 162. As such, data may be securely transferred between the first LAN 128 and the MLS network 104 via the fibre channel 162.

As shown in FIG. 1, level B communication (e.g., fibre channel communication) occurs between the second router 130 (i.e., level B router) and the SAN 104 via fibre channel 170, and level B fibre channel communication occurs between the second LAN 138 (i.e., level B LAN) and the SAN 104 via fibre channel 172.

As shown in FIG. 1, level B IP communication occurs between the second router 130 (i.e., level B router) and the MLS gateway 150 via IP channel 152a, and level B IP communication occurs between the second LAN 138 (i.e., level B LAN) and the MLS gateway 150 via IP channel 152b.

In various implementations, the MLS system 102 is adapted to communicate with the second security level 114 via the second router 130 (i.e., level B router). For example, the second router 130 is adapted to communicate with the SAN 104 (e.g., MLS network) via the fibre channel 170. As such, data may be securely transferred between the second router 130 and the MLS network 104 via the fibre channel 170. In another example, the second LAN 138 is adapted to communicate with the MLS network 104 via the fibre channel 172. As such, data may be securely transferred between the second LAN 138 and the MLS network 104 via the fibre channel 172.

In one embodiment, the encryption component 124 comprises a bulk encryption component. In various implementations, the encryption component 124 may be utilized to encrypt all data. Additional encryption of each file using, for example, pgp dual key where the public key is for need to know.

In one example, the encryption of data at rest may be generated at the storage segment (e.g., Raid and Tape). This may protect the MLS system 102 from disclosure of data by theft of disk or tape, or inadvertently through break fix and incorrect shipment of media back to a another party (e.g., vendor).

In another example, the encryption of data may be generated while in transient and at rest at a Host Bus Adaptor (HBA). This may protect the MLS system 102 from disclosure of data by theft of disk or tape. This may protect the MLS system 102 from disclosure of data inadvertently through break fix and incorrect shipment of media back to vendor. This may protect the MLS system 102 from disclosure of data by a fibre channel network "sniffer" or replication effort.

In another example, the encryption of data may be generated from a server at a CPU level in the server. This may protect the MLS system 102 from disclosure of data by theft of disk or tape "sniffer" or replication effort. This may protect the MLS system 102 from disclosure of data inadvertently through break fix and incorrect shipment of media back to vendor. This may protect the MLS system 102 from disclosure of data by fibre channel network "sniffer" or replication effort. This may protect the MLS system 102 from disclosure of data by any network "sniffer" or replication effort, as well as memory dump, screen dump, and/or printout.

In various aspects, the MLS system 102 provides a common store for classified data at multiple levels of security in the open or encrypted. The MLS system 102 lowers CPU workload of transfers via direct memory access (DMA) and is not IP/interrupt driven. The MLS system 102 provides an efficient mechanism to share large data files across multiple security levels with high assurance. Data with multiple security classifications may co-exist in the same storage area without need for duplication of replication. As such, the MLS system 102 reduces the amount of storage required in an MLS environment at an exponential rate as data grows. The MLS gateway 150 is adapted to efficiently control access to proper data files by directly controlling access to associated metadata. The MLS system 102 improves performance and enhances security. Unauthorized access is physically reduced due to the multiple layers of defense provided by dedicated fibre channels, data with no metadata mixed together, and a high assurance MLS gateway controlling access to the MLS SAN system. Moreover, with the use of option to encrypt data, data at rest is protected from disclosure through theft, loss, acts of GOD, or nature, and violence or conflict where equipment of facility may be compromised (provided decryption keys are not compromised).

Figure 2:
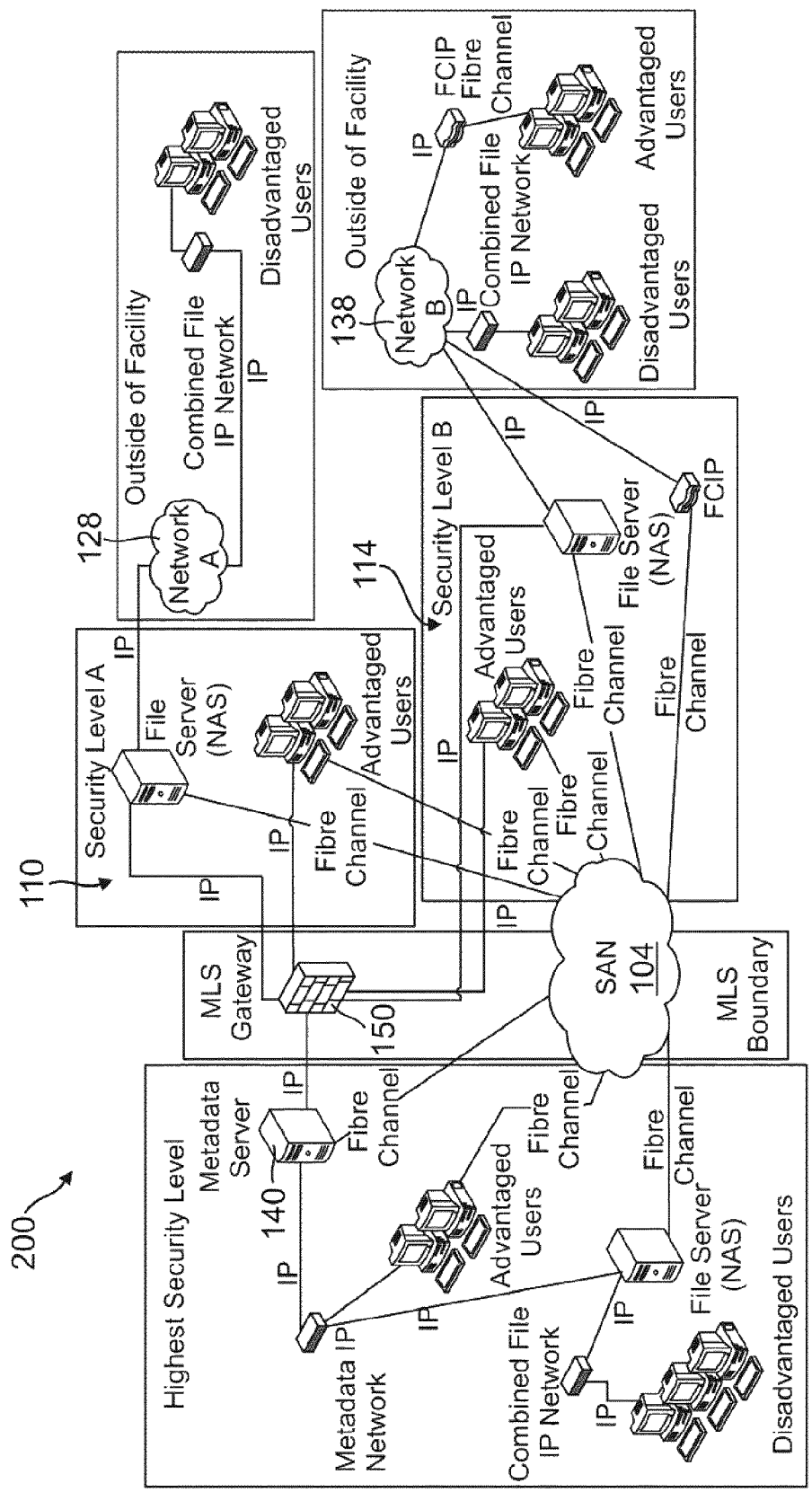
FIG. 2 shows a block diagram of a security database system, in accordance with an embodiment of the present disclosure.

FIG. 2 shows one embodiment of a security database system 200 implementing the MLS system 100 of FIG. 1, which is adapted to communicate with the first security network 110 (e.g., security level A) and a second security network 114 (e.g., security level B). In various implementations, the devices of the system 200 may communicate using various generally known protocols via hard-wired and/or wireless communications (e.g., IP communications and fibre communications).

In various embodiments, one or more of the network servers may comprise a secure network server (SNS) having multi-level security adapted to allow selected files to be shared across multiple security domains while enforcing local security policies. SNS is adapted to filter traffic based on port numbers, data security labels, dirty words searches, specified data formats, and various other selected indicators residing in the data and metadata fields.

In another embodiment, the network servers 212 comprise a security application (e.g., file system security mechanism referred to herein as FireBreak), which is adapted to allow additional database security for protection against unauthorized internal and external users of the database. In one aspect, this is intended for use at system-high only where the data and metadata are separated and made available only to the authorized users without creating concurrent sessions between the internal and external components.

The network servers and the file servers may comprise various types of servers that utilize any type of modern operating systems, such as Microsoft Windows or Unix operating systems. The file servers may be referred to as database servers and may comprise any type of data source, such as a file system, a common executive, a custom application and/or memory that runs on any type of device or processing device capable of running such applications. The network servers and/or the file servers are capable of transmitting and receiving a wide variety of data including metadata, which includes information regarding other data (e.g., actual data) that is transmitted and received by the servers.

The network and file servers may include processing components and may be in communication with other processing servers in the system. The other processing servers may comprise any type of server that utilizes any modern operating system. The processing servers may perform any type of processing associated with data received via the network and file serves. In various implementations, one or more the client devices may transmit a request to the network servers, the network servers may transmit the request to the file servers, and the file servers may process the request.

The file servers may comprise any type of storage device, such as disks, tapes and/or memory. In one implementation, the file servers may comprise a Redundant Array of Independent Disk (RAID) that provide data availability and performance by combining multiple storage disks under common management. The file servers may be adapted to store large amounts of data in a plurality of RAIDs associated with a switch or hub. The file servers may be integrated as part of the SAN 104, which comprises an infrastructure utilizing Fibre Channel (FC) technology that allows multiple servers to efficiently connect to shared storage devices, such as RAIDs. Although SANs may be implemented in Internet Protocol (IP) networks, they may also be implemented in other networks, such as Small Computer Storage Interface (SCSI) networks to provide increased security.

The network and file servers may communicate with one or more client devices via the SAN 104. In various embodiments, the SAN 104 may be implemented as a single network or a combination of multiple networks. For example, SAN 104 may include the Internet and/or one or more intranets, landline networks, wireless networks, and/or other appropriate types of communication networks. In another example, the SAN 104 may comprise a wireless telecommunications network (e.g., cellular phone network) adapted to communicate with other communication networks, such as the Internet.

The client devices, in various embodiments, may be implemented using any appropriate combination of hardware and/or software configured for wired and/or wireless communication over the SAN 104. For example, the client devices may be implemented as a personal computer of a user (e.g., a client) in communication with the SAN 104. In other examples, the client devices: may be implemented as a wireless telephone (e.g., cell phone), personal digital assistant (PDA), notebook computer, and/or various other generally known types of wired and/or wireless computing devices. In one aspect, the client devices may be referred to as a user device without departing from the scope of the present disclosure.

The client devices, in various embodiments, may comprise any type of computing device or configuration operating on any type of computer platform and capable of supporting a user interface. The user interface may include a browser, such as network browser or any other interface capable of appropriately displaying data, soliciting user input, and communicating with the SAN 104. The client devices may be adapted to communicate with the network and file servers via the SAN 104.

In one embodiment, at least one security device (e.g., firewall security device) may be located between the network and file servers and the client devices. The security device may comprise a computing device or a group of computing devices that implement filtering, monitoring and logging of sessions between the client devices and the network and file servers. The security device may be implemented in applications that reside on the network and file servers, or in separate hardware units, such as routers. If the security device is located in the communication path between the client devices and the network and file servers, the information transmitted between the client devices and the network and file servers may pass through the firewall of the security device. The security device, thus, adds a layer of security on the side of the network and file servers that communicates with the SAN 104 to block particular client devices from accessing the network and file servers.

Figure 3:
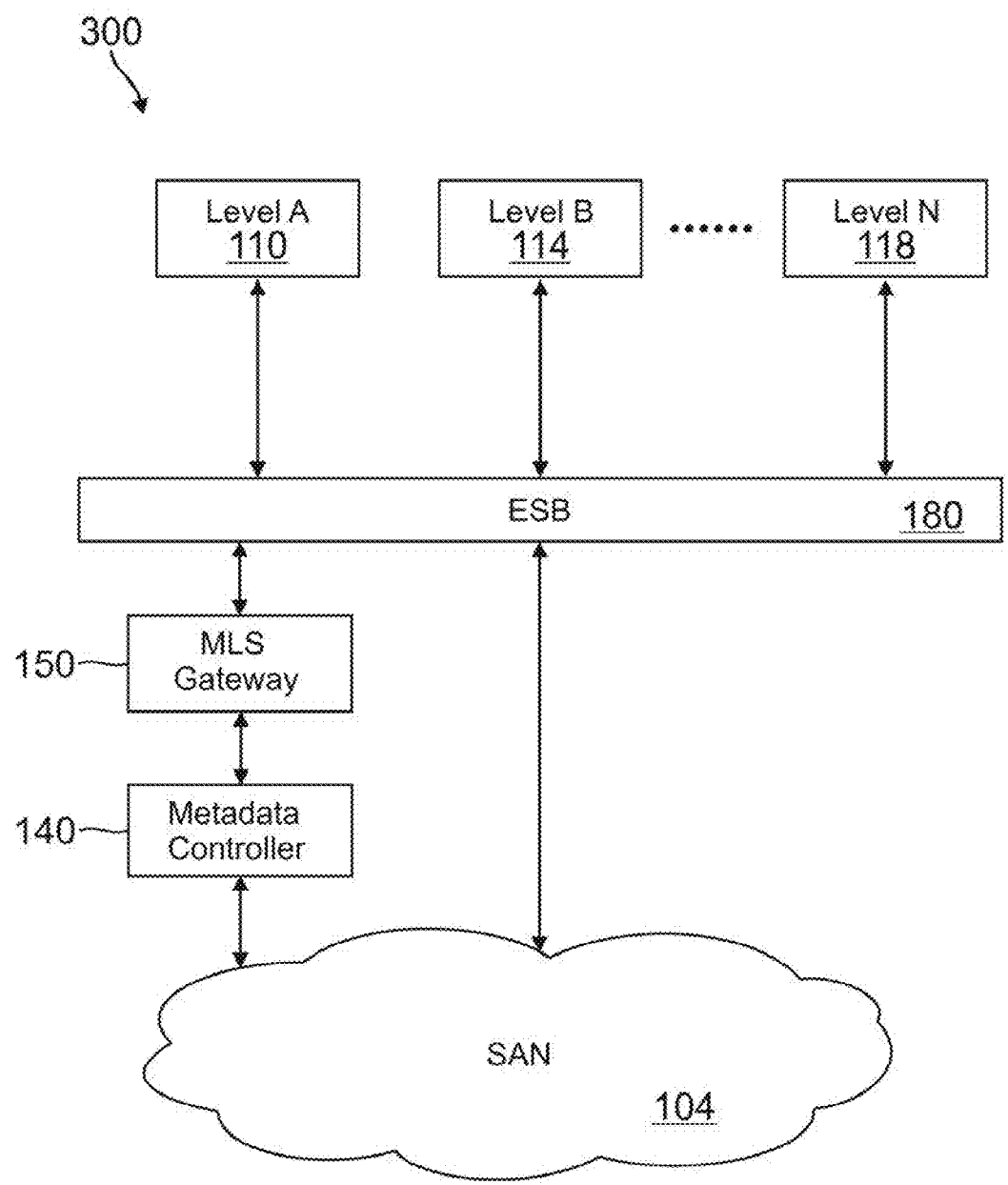
FIG. 3 shows a block diagram of a multi-level security system, in accordance with an embodiment of the present disclosure.

FIG. 3 shows a block diagram of a security database system 300, which broadly implements the MLS system 100 of FIG. 1. As shown in FIG. 3, the SAN 104 is adapted to communicate with a plurality of security networks including the security level A network 110, the security level B network 114, and one or more other security level networks 118 (e.g., any number from 1 to N). In one implementation, the security levels 110, 114, 118 may directly communicate with the SAN 104 via a commutations bus (ESB) 180. In another implementation, the security levels 110, 114, 118 may indirectly communicate with the SAN 104 via the commutations bus (ESB) 180 and the MLS gateway 150 and the metadata controller 140. As described herein, the devices of the system 300 may communicate using various generally known protocols via hard-wired and/or wireless communications (e.g., IP communications and fibre communications).

Figure 4A:
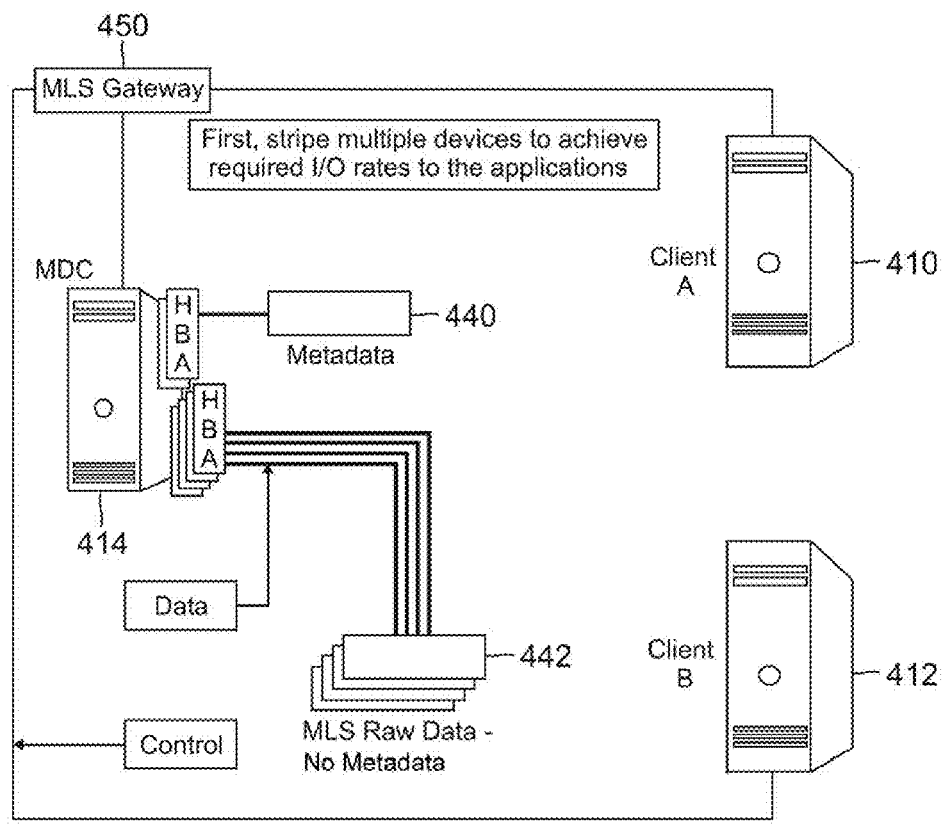
FIGS. 4A-4R show various operations in a process for sharing data among multiple hosts, in accordance with one or more embodiments of the present disclosure.
Figure 4B:
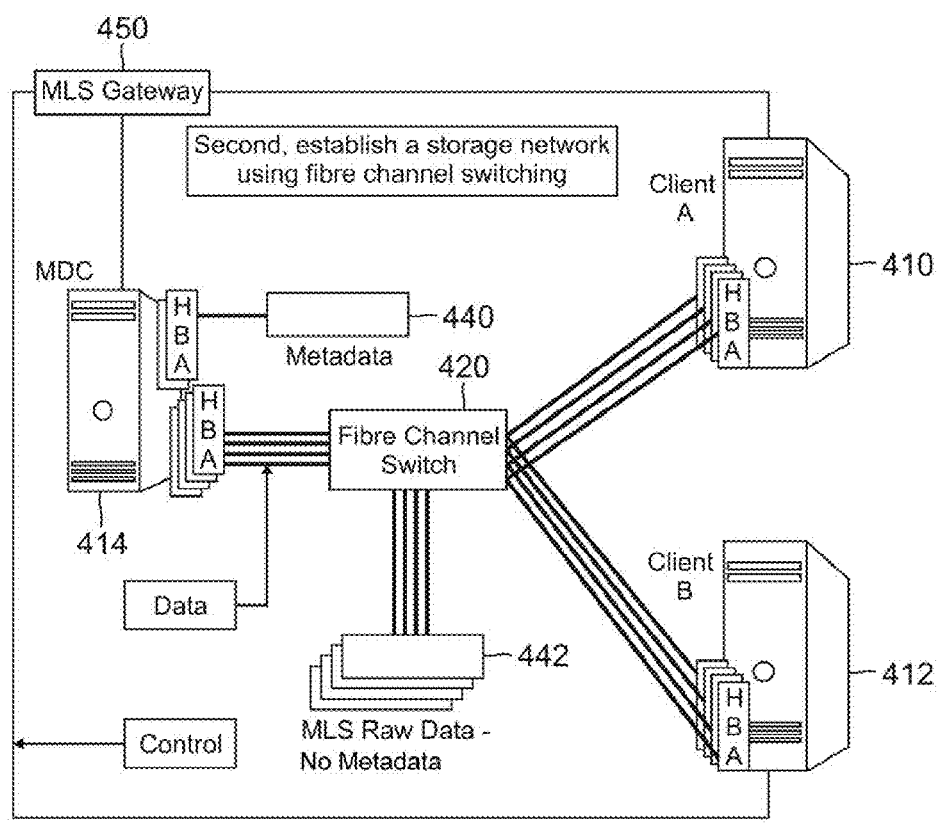
Figure 4C:
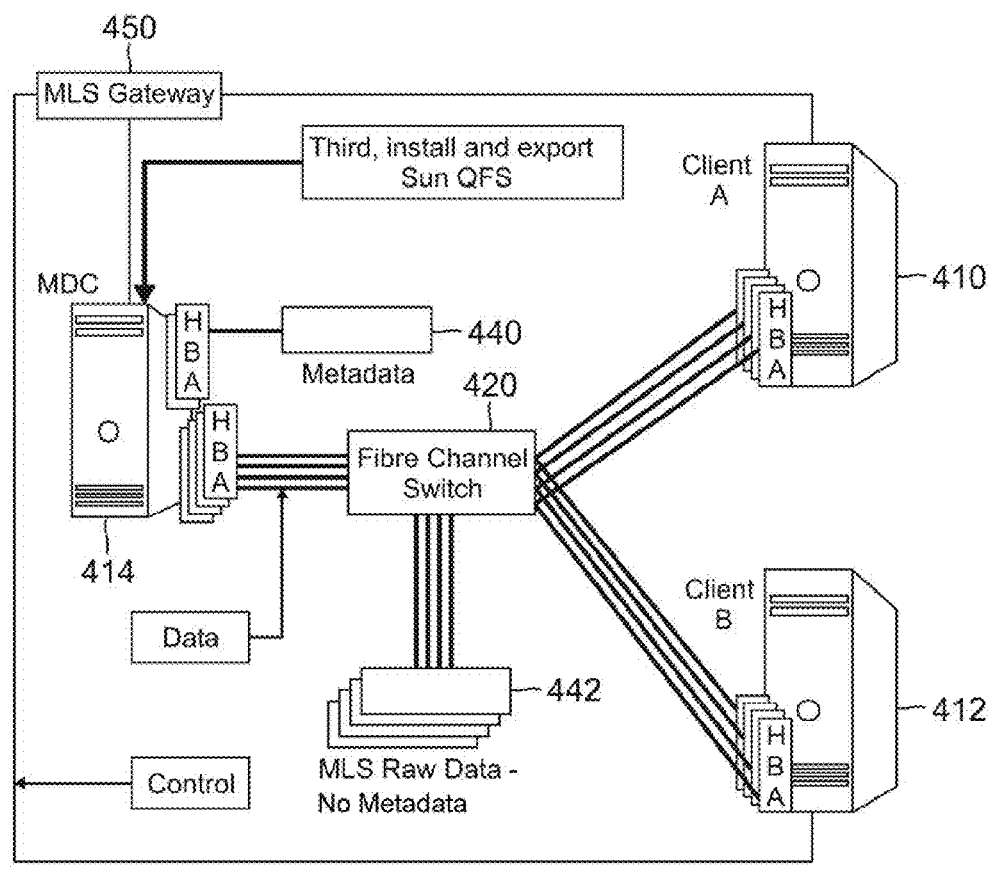
Figure 4D:
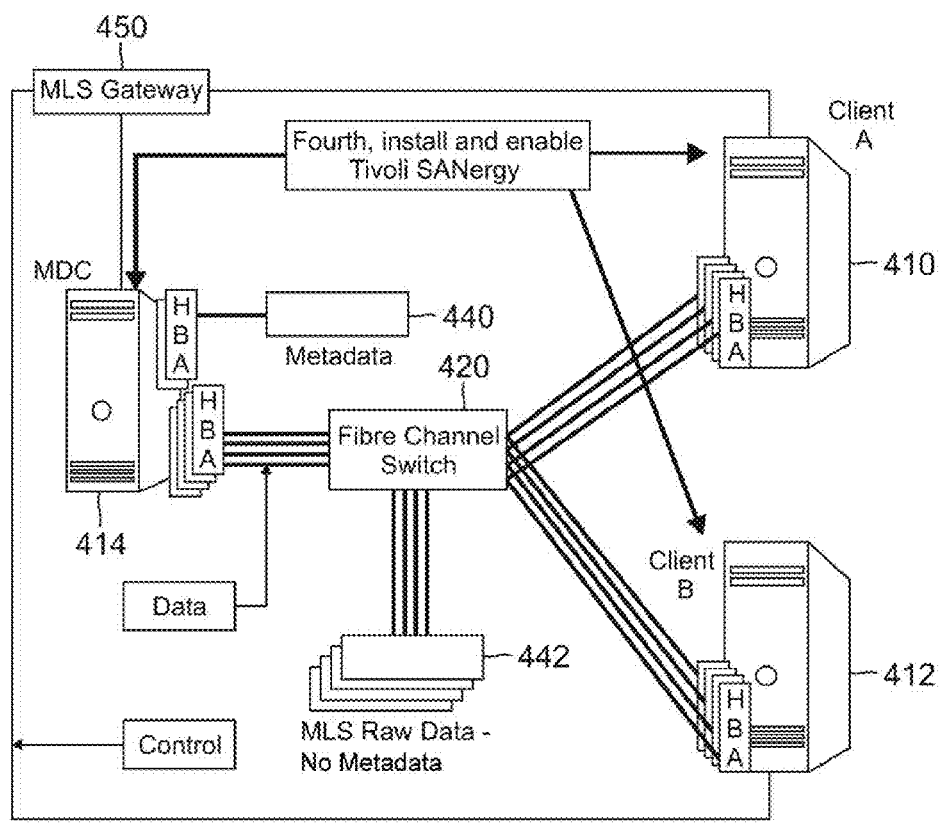
Figure 4E:
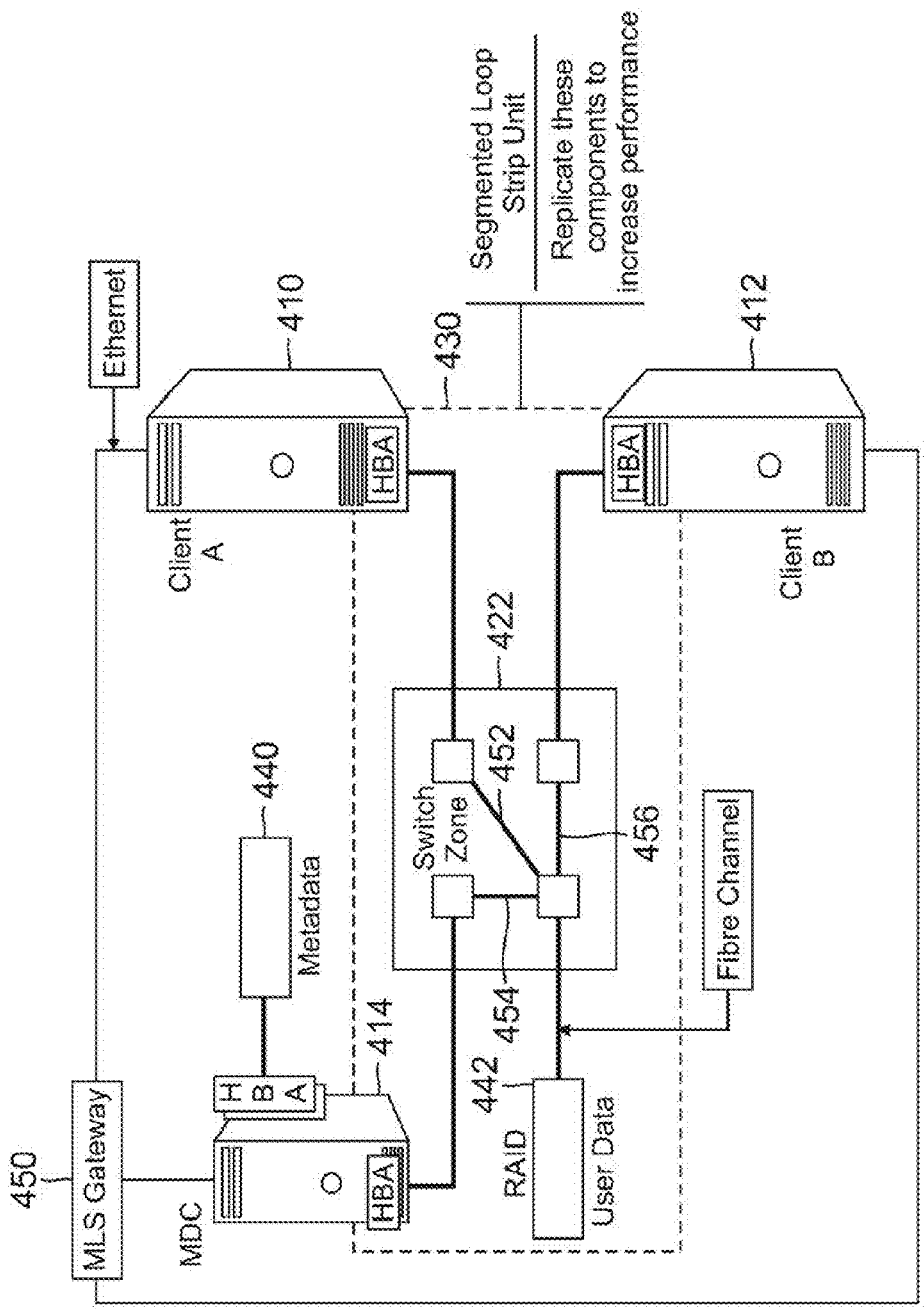
Figure 4F:
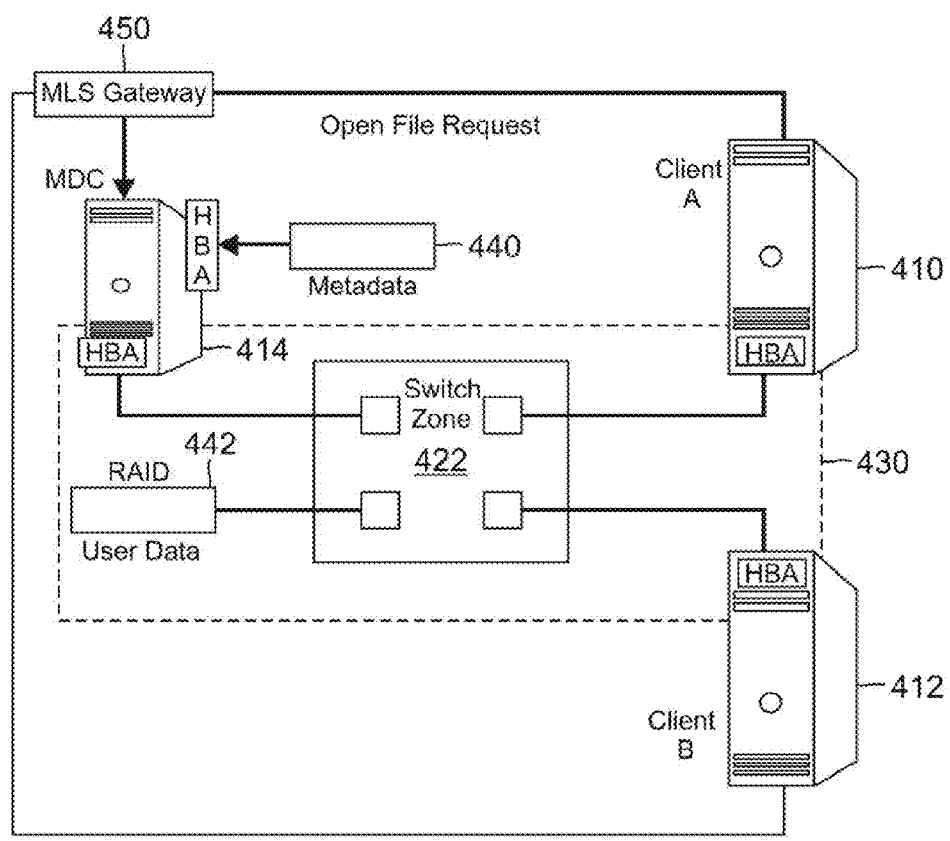
Figure 4G:
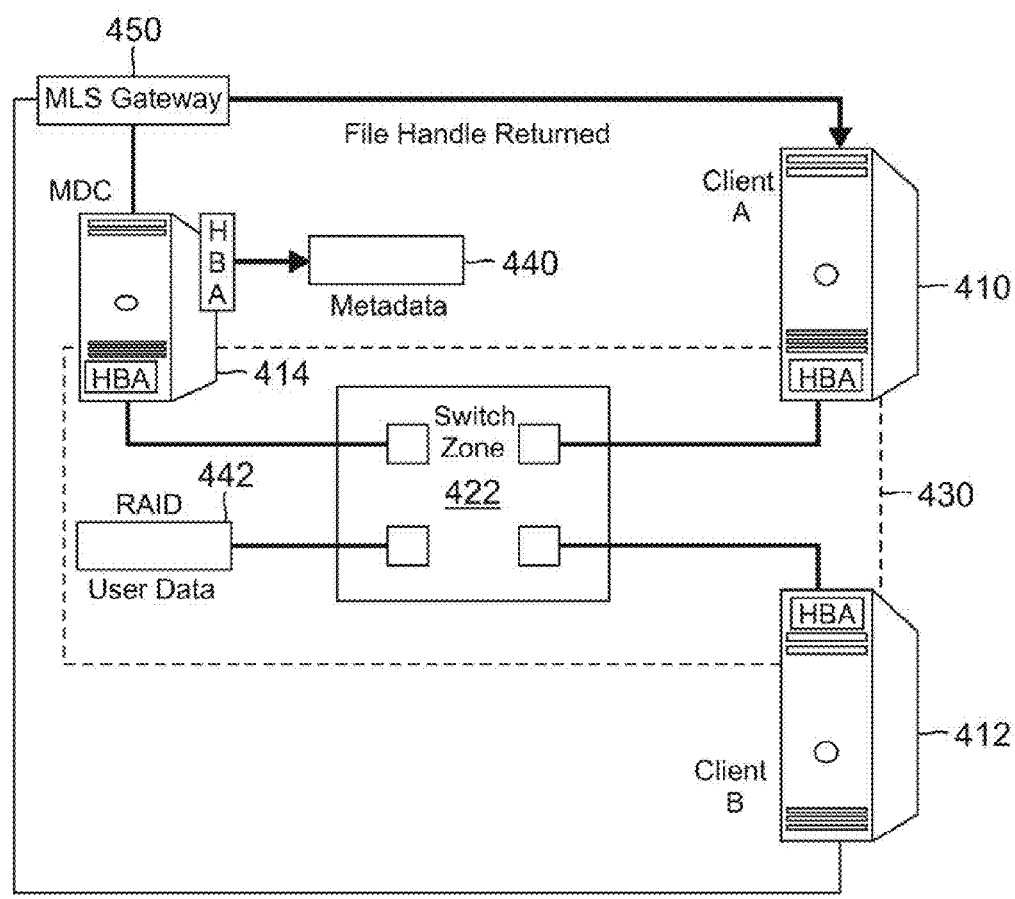
Figure 4H:
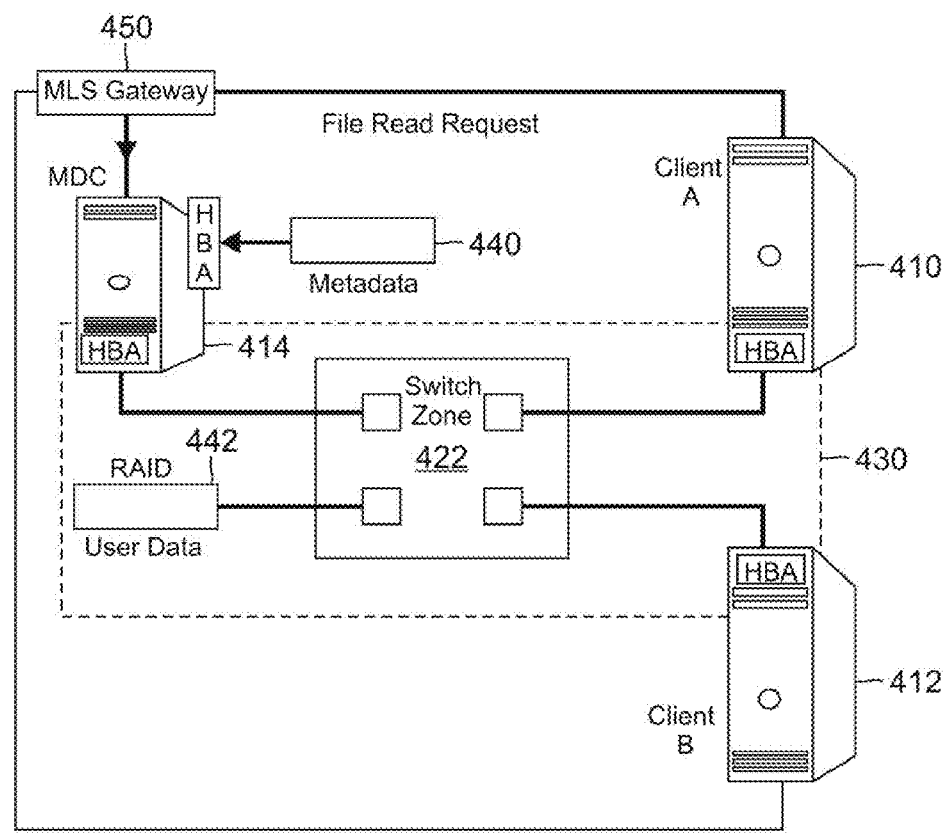
Figure 4I:
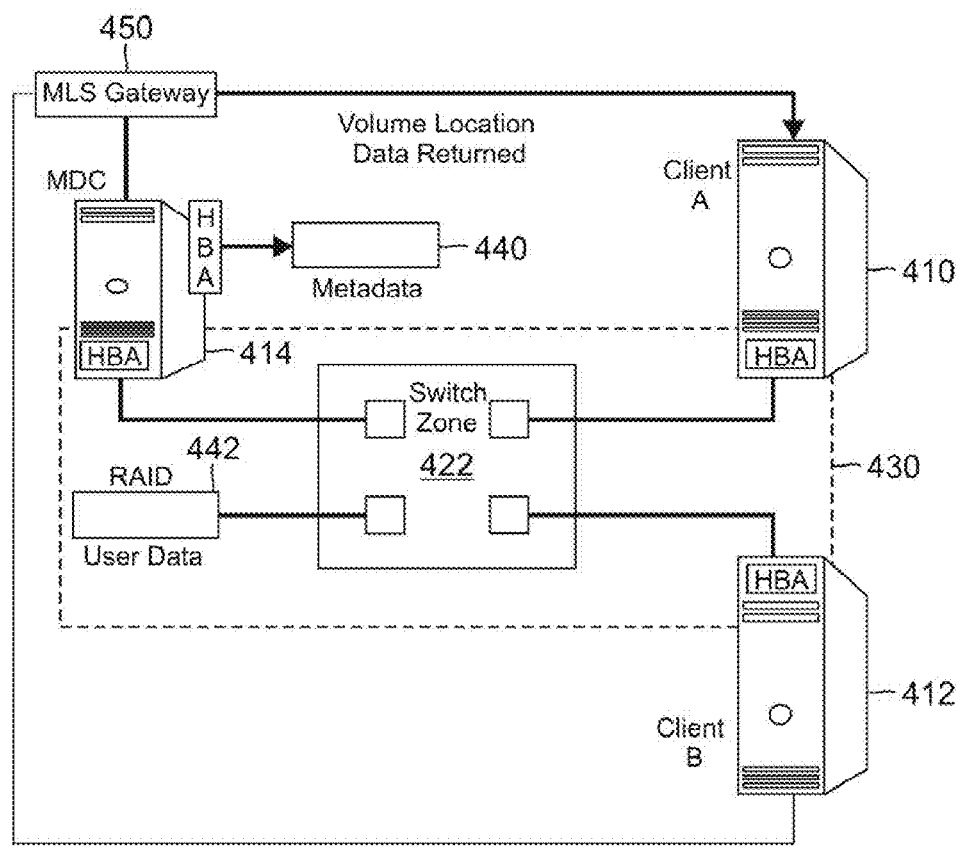
Figure 4J:
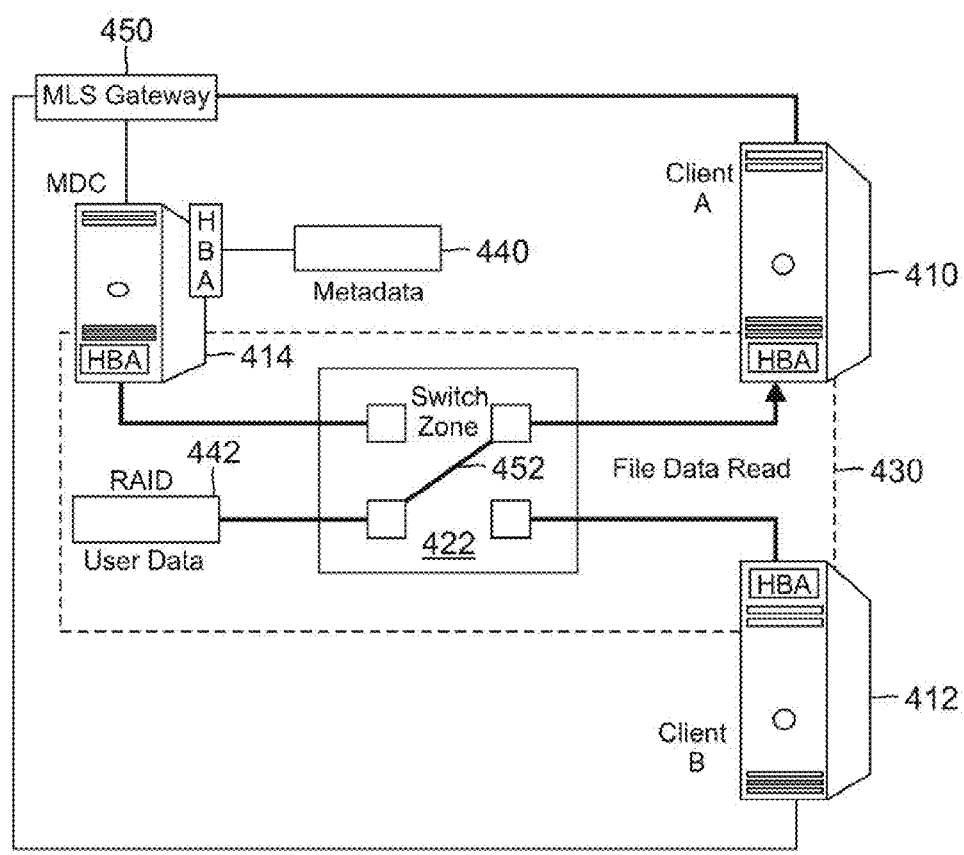
Figure 4K:
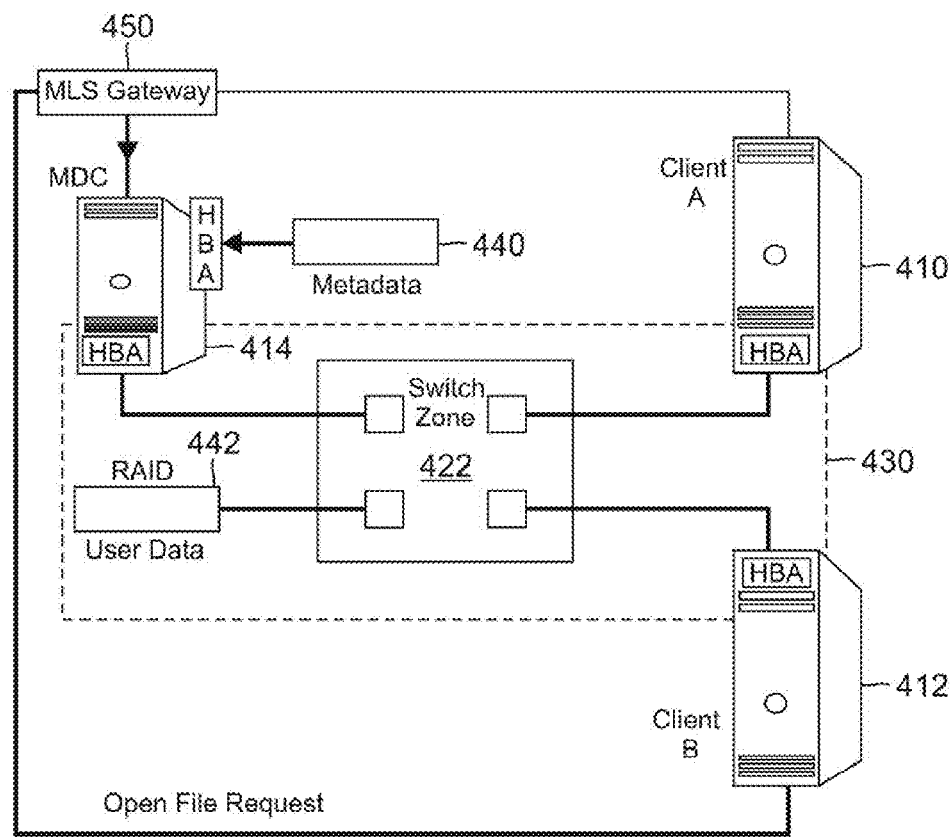
Figure 4L:
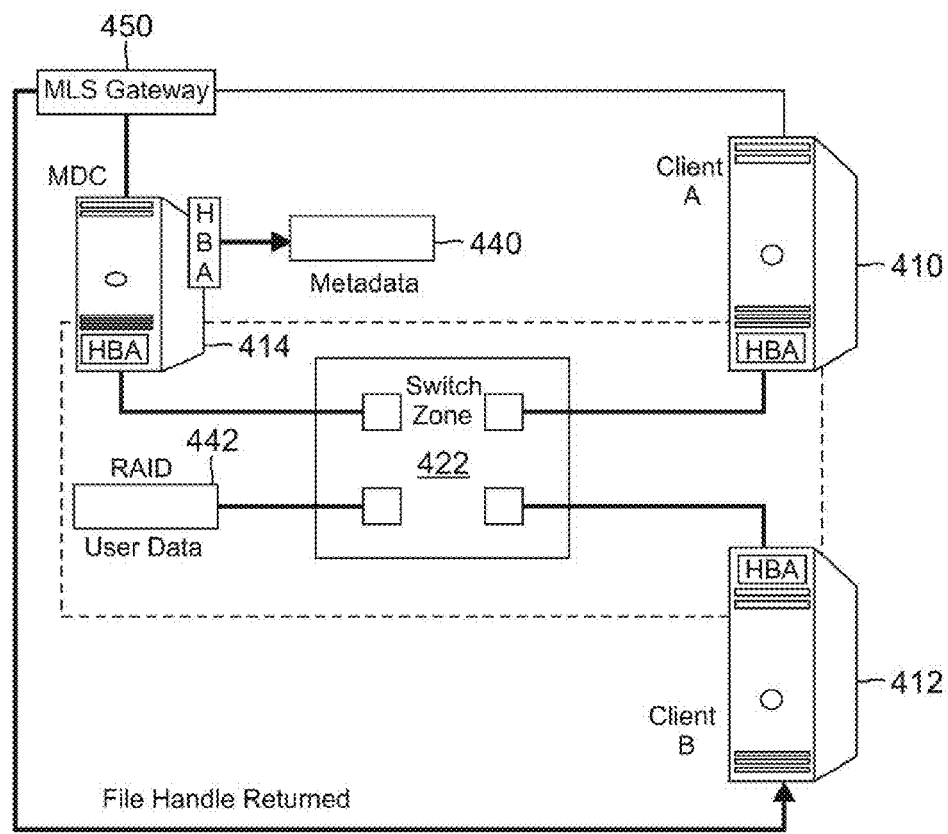
Figure 4M:
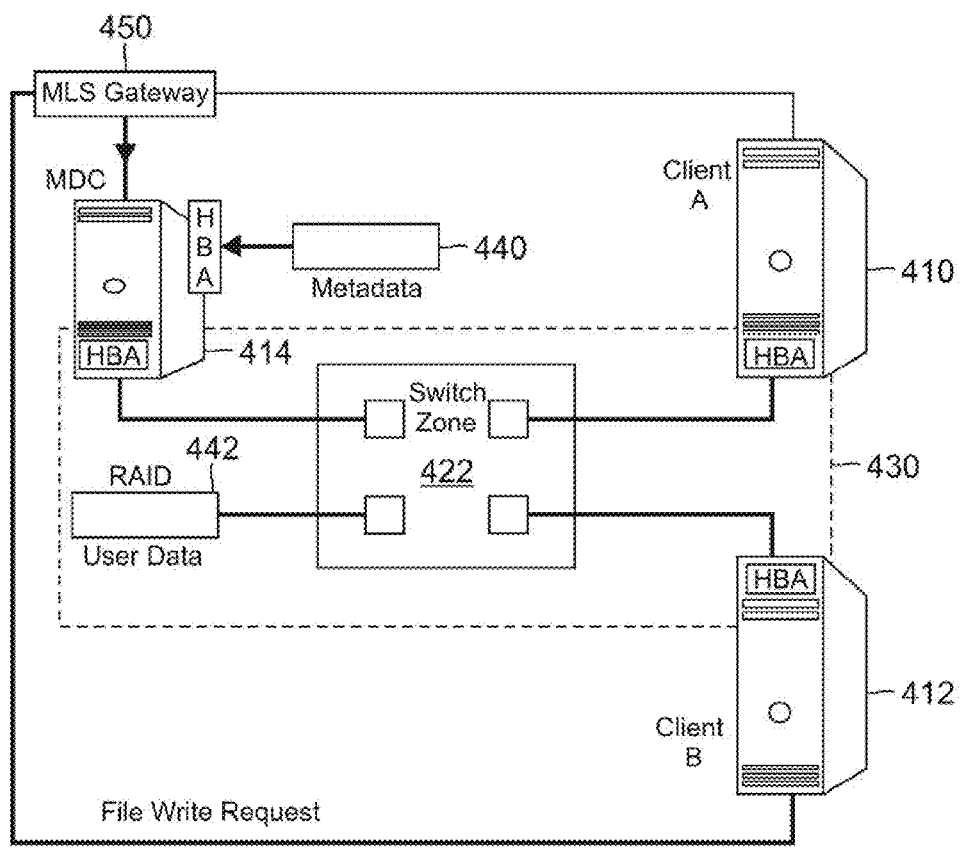
Figure 4N:
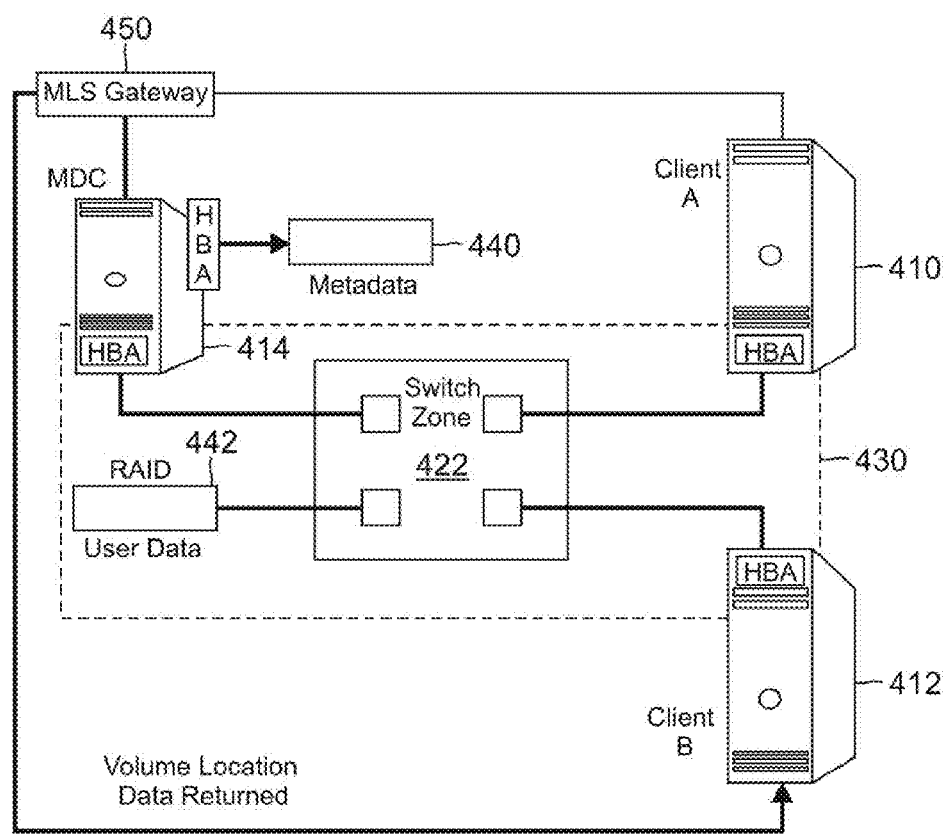
Figure 4O:
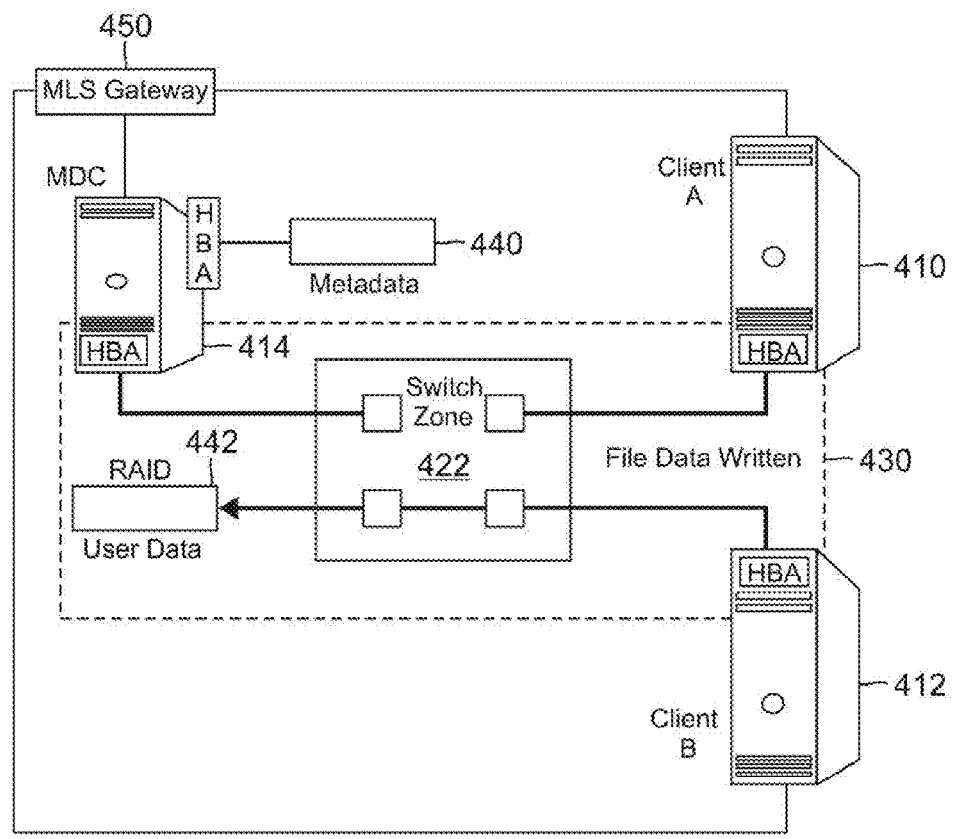
Figure 4P:
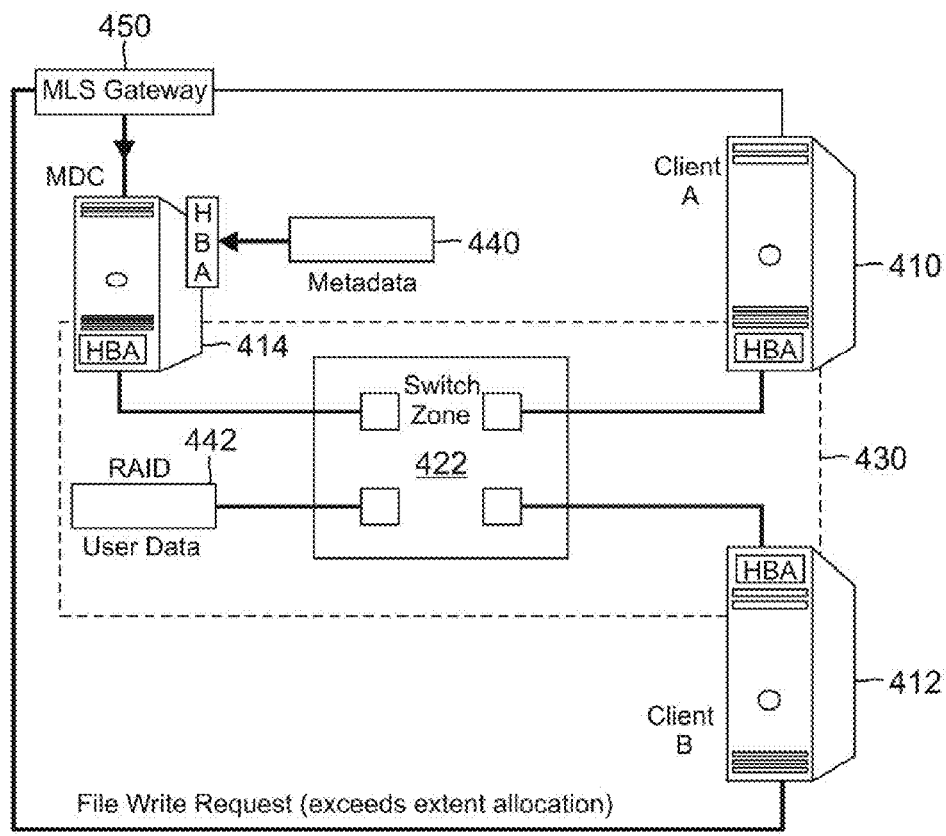
Figure 4Q:
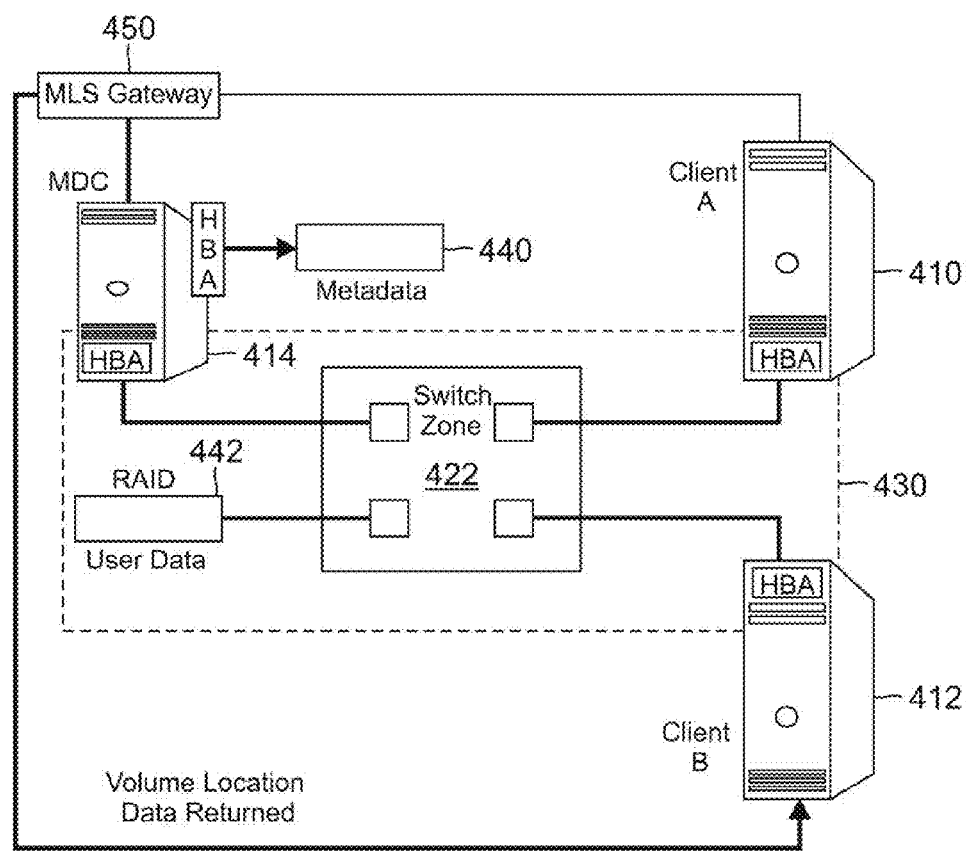
Figure 4R:
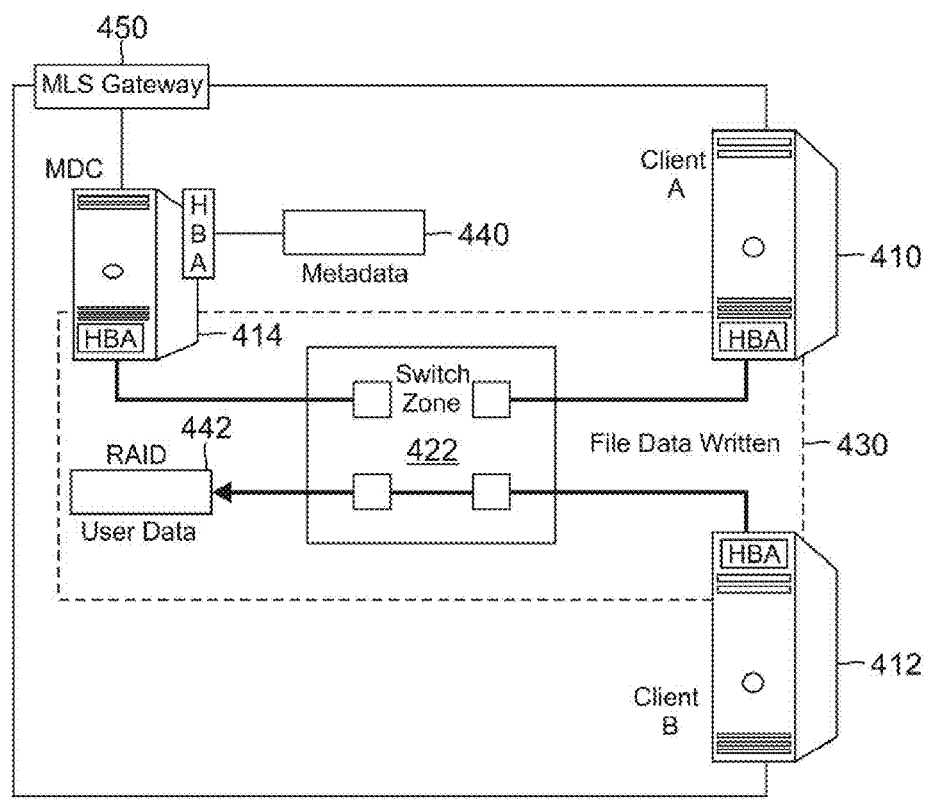

In accordance with one or more embodiments of the present disclosure, FIGS. 4A-4R show various operations in a process for sharing data among multiple hosts including a first server 410 (e.g., client A) and a second server 412 (client B) in communication with a metadata controller (MDC) 414 and MLS gateway 450. In one embodiment, the MDC 414 may comprise a metadata server and the MLS gateway 450 may comprise a security gateway device or component, without departing from the scope of the present disclosure. In various implementations, it should be appreciated that one or more of the system components, as described in reference to FIGS. 4A-4R, may be used to identify similar system components, as shown in FIGS. 1-3, without departing from the scope of the present disclosure.

As shown in FIG. 4A, multiple devices are striped together to achieve input/output (I/O) rates to particular applications. In one implementation, control signals and/or metadata may be transferred between the servers 410, 412, the MDC 414, and at least one metadata storage device 440. In another implementation, data (e.g., MLS raw data having no metadata) may be transferred between the servers 410, 412, the MDC 414, and one or more data storage devices 442, which may necessitate the use of one or more storage network connections (e.g., fibre connections).

In various implementations, the MDC 414 may comprise one or more host-bus adapters (HBA), which may comprise a network interface device (e.g., card) for communication with the metadata storage device 440 and the one or more data storage devices 442. In various implementations, the metadata storage device 440 and each of the one or more data storage devices 442 may comprise various types of storage devices including, for example, a RAID storage device.

In accordance with one or more embodiments of the present disclosure, the MDC 414 may be adapted to disable ports on the Fibre Channel Switch 420, e.g., when not in use. In one implementation, the servers 410, 412 may be required to request access from the MDC 414 before their connection to the Fibre Channel Switch 420 port is enabled for use. The MDC 414 may configure the ports on the Fibre Channel Switch by remotely commanding the configuration of the switch. The MDC 414 may be adapted to monitor the connections on the Fibre Channel Switch 420.

In various implementations, the Fibre Channel Switch 420 comprises a channel switching mechanism adapted to route data between the MDC 414 and the first server 410, the second server 412, the metadata storage device 440, and the one or more data storage devices 442 (e.g., for storage of MLS raw data having no metadata). The Fibre Channel Switch 420 may be referred to as a channel switching mechanism having one or more shared storage network ports that are adapted to be controlled by the MDC 414, and the use of the shared storage network ports are monitored by the MDC 414. As such, the shared storage network ports are enabled by the MDC 414 for use, and the shared storage network ports are disabled by the MDC 414 when not in use.

As shown in FIG. 4B, a storage network is established using fibre channel switching via a fibre channel switch 420. In one implementation, the fibre channel switch 420 allows the transfer of data to the servers 410, 412. In various implementations, the servers 410, 412 may comprise one or more host-bus adapters (HBA) for communication with the MDC 414 and the one or more storage device 442 via the fibre channel switch 420.

As shown in FIG. 4C, an support application (e.g., Sun QFS) is installed and exported on the MDC 414. As shown in FIG. 4D, another support application (e.g., Tivoli SANergy) is installed and exported to the MDC 414 and the first and second servers 410, 412.

As shown in FIG. 4E, a segmented loop stripe unit 430 is established to replicate the fibre channel switch 420 for increased performance. In various implementations, loop may include fabric loop or full fabric to the disk drives, which may replace fabric loop and/or arbitrated loop. In one embodiment, a switch zone 422 is interposed between the servers 410, 412 and the MDC 414 to replace the fibre channel switch 420. In one aspect, the switch zone 422 establishes a plurality of communication links 452, 454, 456 between the servers 410, 412 and the MDC 414 for data transfer. In another aspect, the one or more storage devices 442 may be combined with the use of a RAID storage device, which may reduce the number of storage network connections, for example, to a single storage network connection, as shown in FIG. 4E.

Next, as shown in FIG. 4F, the MDC 414 receives an open file request signal from the first server 410. In one implementation, the MDC 414 is adapted to access and process metadata from the at least one metadata storage device 440 based on the open file request signal from the first server 410.

As shown in FIG. 4G, the MDC 414 provides a file handle return signal to the first server 410. The MDC 414 is adapted to access and process the metadata from the metadata storage device 440 based on the file handle return signal.

As shown in FIG. 4H, the MDC 414 receives a file read request signal from the first server 410. The MDC 414 is adapted to access and process metadata from the metadata storage device 440 based on the file read request signal from the first server 410.

As shown in FIG. 4I, the MDC 414 provides a volume location data returned signal to the first server 410. The MDC 414 is adapted to access and process metadata from the metadata storage device 440 based on the volume location data returned signal.

As shown in FIG. 4J, the first server 410 reads data (e.g., user file data) from a data storage component 442 via a communication link 452 in the switch zone 422.

Next, as shown in FIG. 4K, the MDC 414 receives an open file request signal from the second server 412. The MDC 414 is adapted to access and process metadata from a metadata storage device 440 based on the open file request signal from the second server 412.

As shown in FIG. 4L, the MDC 414 provides a file handle return signal to the second server 412. The MDC 414 is adapted to access and process the metadata from the metadata storage device 440 based on the file handle return signal.

As shown in FIG. 4M, the MDC 414 receives a file write request signal from the second server 412. In one implementation, the MDC 414 is adapted to access and process metadata from the metadata storage device 440 based on the file write request signal from the second server 412.

As shown in FIG. 4N, the MDC 414 provides a volume location data returned signal to the second server 412. The MDC 414 is adapted to access and process metadata from the metadata storage device 440 based on the volume location data returned signal.

As shown in FIG. 4O, the second server 412 writes data (e.g., user file data) to the data storage component 442 via the communication link 456 in the switch zone 422.

Next, in another embodiment, as shown in FIG. 4P, the MDC 414 may receive an alternate file write request signal, that includes a provision for exceeding extent allocation, from the second server 412. The MDC 414 is adapted to access and process metadata from the metadata storage device 440 based on the alternate file write request signal from the second server 412.

As shown in FIG. 4Q, the MDC 414 provides a volume location data returned signal to the second server 412. The MDC 414 is adapted to access and process metadata from the metadata storage device 440 based on the volume location data returned signal.

As shown in FIG. 4R, the second server 412 writes data (e.g., user file data) to the data storage component 442 via the communication link 456 in the switch zone 422.

Figure 5:
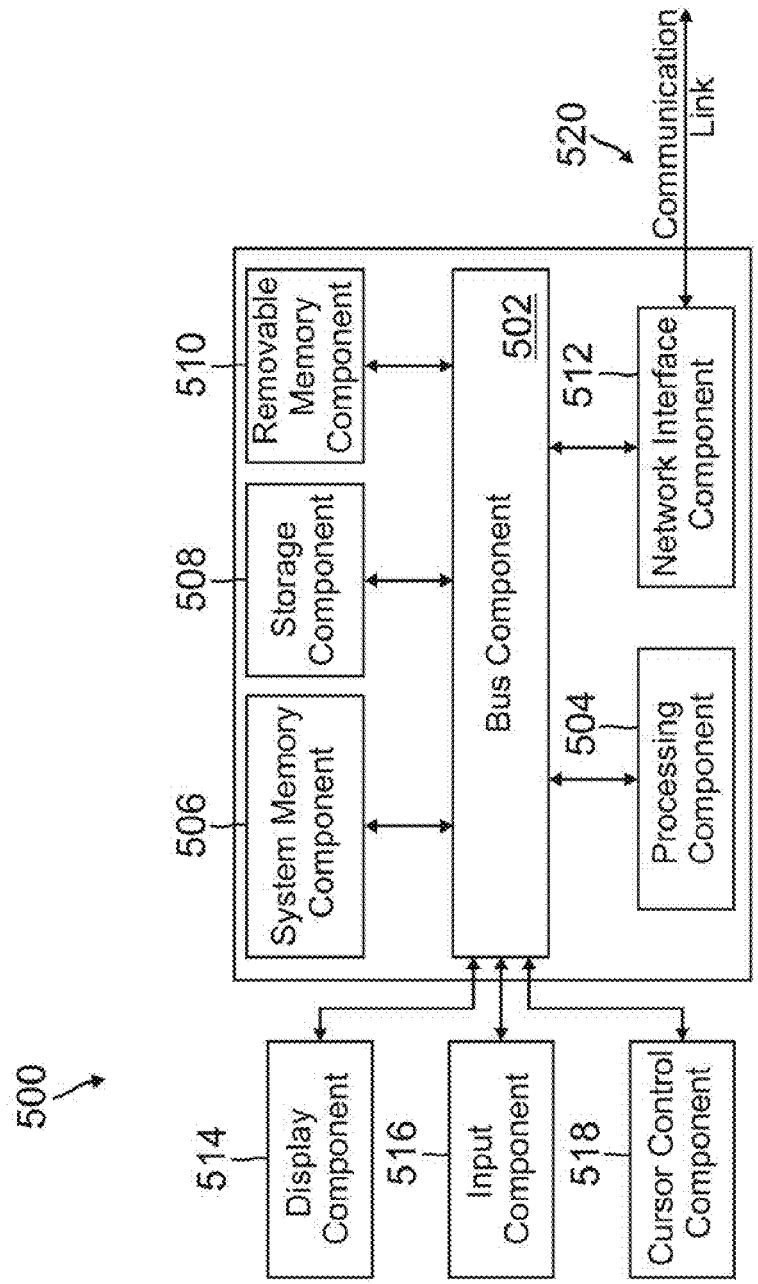
FIG. 5 is a block diagram of a computer/controller system suitable for implementing one or more embodiments of the present disclosure.

FIG. 5 is a block diagram of a computer system and/or controller 500 suitable for implementing one or more embodiments of the present disclosure. Computer system 500 includes a bus 502 or other communication mechanism for communicating information, which interconnects subsystems and components, such as processor 504, system memory component 506 (e.g., RAM), static storage component 508 (e.g., ROM), removable memory component 510 (e.g., removable ROM memory, such as EEPROM, smart card, flash memory, etc.), wired or wireless communication interface 512 (e.g., transceiver, modem or Ethernet card), display component 514 (e.g., LCD, CRT, etc.), input component 516 (e.g., sensors, such as optical sensors including stereoscopic cameras, keyboard, microphone, touch screen on display), and cursor control component 518 (e.g., mouse button).

In accordance with embodiments of the present disclosure, computer system 500 performs specific operations by processor 504 executing one or more sequences of one or more instructions included in system memory component 506. Such instructions may be read into system memory component 506 from another computer readable medium, such as static storage component 508 or removable memory component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes removable storage media, such as removable memory component 510, volatile media includes dynamic memory, such as system memory component 506, and transmission media including wireless transceivers. In one example, transmission media may take the form of radio waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 520 (e.g., wireless cell phone network, wireless or wired LAN, PTSN, or various other wireless networks) may perform instruction sequences to practice the present disclosure in coordination with one another.

Computer system 500 may transmit and receive messages, data, information and instructions, including one or more programs (i.e., application code) through communication link 520 and communication interface 512. Received program code may be executed by processor 504 as received and/or stored in removable memory component 510 or some other non-volatile storage component for execution.

Where applicable, various embodiments of the present disclosure may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system for sharing data over one or more networks, the system comprising:
   a storage area network configured to communicate with the one or more networks;
   a first component configured to route data to and from the storage area network via a first storage network connection;
   a second component configured to route data to and from the storage area network via a second storage network connection;
   a gateway component configured to control the routing of data between the first and second components and the storage area network; and
   a metadata controller configured to separate metadata from the data, store the metadata in a first database, and store the data without metadata in a second database, wherein the metadata includes the data location of and is required to access the data without metadata stored in the second database,
   the metadata controller is located behind the gateway component,
   the gateway component includes a security component that directly controls and authorizes access to the metadata controller and the metadata,
   requests for data are made by a client through the gateway component via a first channel network connection, and
   transfers of data are made directly from the storage area network to the client through a second channel and without passing through the gateway component.

2. The system of claim 1, wherein the metadata controller is configured to encrypt and store the metadata in the first database separate from the second database, and wherein the first database comprises a metadata database.

3. The system of claim 1, wherein the metadata controller is configured to encrypt and store the data without the metadata in the second database separate from the first database.

4. The system of claim 1, wherein the first and second databases comprise RAID storage devices.

5. The system of claim 1, wherein the gateway security component controls one or more authorizations and decryption keys for accessing at least the data in the storage area network.

6. The system of claim 1, wherein the gateway security component controls access to at least the data in the storage area network from different security domains.

7. The system of claim 1, wherein at least one of the first and second storage network connections to the storage area network comprises a Fiber Channel network connection.

8. The system of claim 1, wherein the data comprises multi-level security data, and wherein the storage area network is configured to store the multi-level security data in the second database separate from the first database.

9. The system of claim 1, wherein the metadata controller comprises a metadata server configured to control the routing of data between the first and second components, the first and second databases, and the storage area network.

10. The system of claim 1, wherein the metadata controller comprises a plurality of metadata host-bus adapters, each configured to communicate with the first and second databases separately of the others.

11. The system of claim 1, wherein the first component comprises a network server configured to communicate with the storage area network to route data to and from the storage area network via the first storage network connection.

12. The system of claim 1, wherein the second component comprises a second server configured to communicate with the storage are network to route data to and from the storage area network via the second storage network connection.

13. The system of claim 1, further comprising a channel switching mechanism configured to route data between the metadata controller and one or more of the first component, the second component, the first database, and the second database.

14. The system of claim 13, wherein the channel switching mechanism comprises one or more shared storage network ports that are configured to be controlled by the metadata controller, and wherein the use of the shared storage network ports are monitored by the metadata controller.

15. The system of claim 14, wherein the shared storage network ports are enabled by the metadata controller for use, and wherein the shared storage network ports are disabled by the metadata controller when not in use.

16. A method for sharing data over one or more networks, the method comprising:
  establishing a storage area network to facilitate communication with the one or more networks;
  routing data to and from a first component over the storage area network via a first storage network connection;
  routing data to and from a second component over the storage area network via a second storage network connection;
  controlling the routing of data between the first and second components and the storage area network with a gateway component; and
  using a metadata controller to:
    separate metadata from the data;
    store the metadata in a first database; and
    store the data without metadata in a second database, wherein
  the metadata includes the data location of and is required to access the data without metadata stored in the second database,
  the metadata controller is located behind the gateway component,
  the gateway component includes a security component that directly controls and authorizes access to the metadata controller and the metadata,
  requests for data are made by a client through the gateway component via a first channel network connection, and
  transfers of data are made directly from the storage area network to the client through a second channel and without passing through the gateway component.

17. The method of claim 16, further comprising encrypting and storing the metadata in the first database separate from the second database, and wherein the first database comprises a metadata database.

18. The method of claim 16, further comprising encrypting and storing the data without the metadata in the second database separate from the first database.

19. The method of claim 16, further comprising controlling one or more authorizations and decryption keys for accessing at least the data in the storage area network using the gateway security component.

20. The method of claim 16, further comprising controlling access to at least the data in the storage area network from different security domains using the gateway security component.

21. The method of claim 16, further comprising controlling a channel switching mechanism to route data between the first component, the second component, the first database, and the second database.

22. The method of claim 21, further comprising:
  controlling one or more shared storage network ports of the channel switching mechanism; and
  monitoring the use of the one or more shared storage network ports of the channel switching mechanism.

23. The method of claim 22, further comprising:
  enabling the shared storage network ports for use; and
  disabling the shared storage network ports when not in use.

24. A non-transitory machine-readable medium comprising a plurality of machine-readable instructions which, when executed by one or more processors of a server, are configured to cause the server to perform a method comprising:
  establishing a storage area network to facilitate communication with the one or more networks;
  routing data to and from a first component over the storage area network via a first storage network connection;
  routing data to and from a second component over the storage area network via a second storage network connection;
  controlling the routing of data between the first and second components and the storage area network with a gateway component; and
  using a metadata controller to:
    separate metadata from the data;
    store the metadata in a first database; and
    store the data without metadata in a second database, wherein
  the metadata includes the data location of and is required to access the data without metadata stored in the second database,
  the metadata controller is located behind the gateway component,
  the gateway component includes a security component that directly controls and authorizes access to the metadata controller and the metadata,
  requests for data are made by a client through the gateway component via a first channel network connection, and
  transfers of data are made directly from the storage area network to the client through a second channel and without passing through the gateway component.

* * * * *